(12) United States Patent
Kashima et al.

(10) Patent No.: US 9,184,690 B2
(45) Date of Patent: Nov. 10, 2015

(54) ELECTRICALLY DRIVEN POWER STEERING SYSTEM AND CONTROL APPARATUS FOR THE SAME

(71) Applicant: Hitachi Automotive Systems Steering, Ltd., Hiki-gun, Saitama (JP)

(72) Inventors: Masaki Kashima, Atsugi (JP); Atsushi Yoshitaka, Ebina (JP)

(73) Assignee: Hitachi Automotive Systems Steering, Ltd., Saitama (JP)

( * ) Notice: Subject to any disclaimer, the term of this patent is extended or adjusted under 35 U.S.C. 154(b) by 166 days.

(21) Appl. No.: 13/861,462

(22) Filed: Apr. 12, 2013

(65) Prior Publication Data

US 2014/0077733 A1    Mar. 20, 2014

(30) Foreign Application Priority Data

Sep. 18, 2012 (JP) .................. 2012-203868

(51) Int. Cl.
*H02P 6/00* (2006.01)
*H02P 27/00* (2006.01)
*H02P 29/00* (2006.01)
*B62D 5/04* (2006.01)

(52) U.S. Cl.
CPC ............... *H02P 27/00* (2013.01); *B62D 5/046* (2013.01); *H02P 29/0038* (2013.01)

(58) Field of Classification Search
CPC ............. H02P 7/29; H02P 6/14; H02P 6/182; H02P 27/08; H02P 6/085
USPC .......... 318/400.01, 400.02, 400.26, 599, 811, 318/800, 727
See application file for complete search history.

(56) References Cited

U.S. PATENT DOCUMENTS

| | | | | |
|---|---|---|---|---|
| 6,973,992 | B2 * | 12/2005 | Yoneda et al. | 180/446 |
| 7,119,530 | B2 * | 10/2006 | Mir et al. | 324/76.15 |
| 7,423,397 | B2 * | 9/2008 | Katahira | 318/432 |
| 7,463,006 | B2 * | 12/2008 | Ta et al. | 318/807 |
| 7,855,527 | B2 * | 12/2010 | Goto et al. | 318/801 |

FOREIGN PATENT DOCUMENTS

| | | |
|---|---|---|
| JP | 2001-327173 A | 11/2001 |
| JP | 2008-131770 A | 6/2008 |

* cited by examiner

*Primary Examiner* — Rina Duda
(74) *Attorney, Agent, or Firm* — Crowell & Moring LLP

(57) ABSTRACT

An electrically driven power steering system is capable of reducing development of a noisy magneto-strictive sound. A voltage corresponding to each PWM pulse achieving time corresponding to a hysteresis is added to one of the voltage command values of a large voltage phase from among three phase first voltage command values. The added voltage is subtracted from one of the remaining voltage command values, which is a voltage small phase, to derive virtual voltage command values, and the virtual voltage command values are mutually compared to carry out a voltage magnitude phase determination for a three-phase brushless motor of the power steering system.

8 Claims, 6 Drawing Sheets

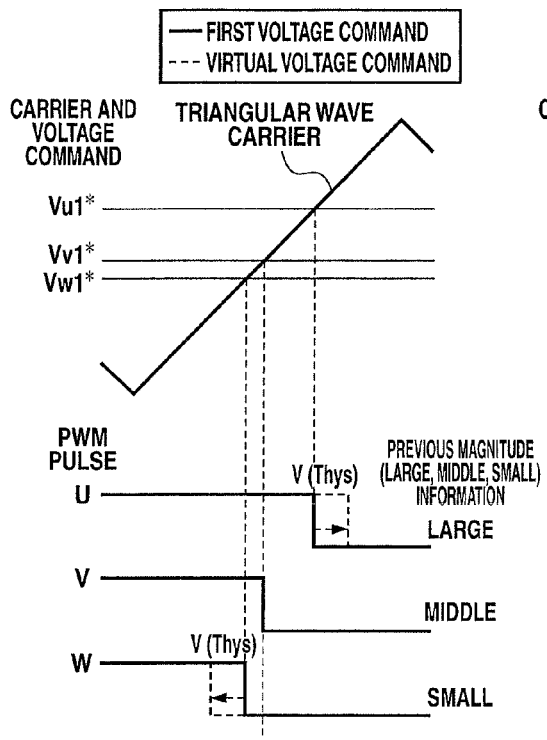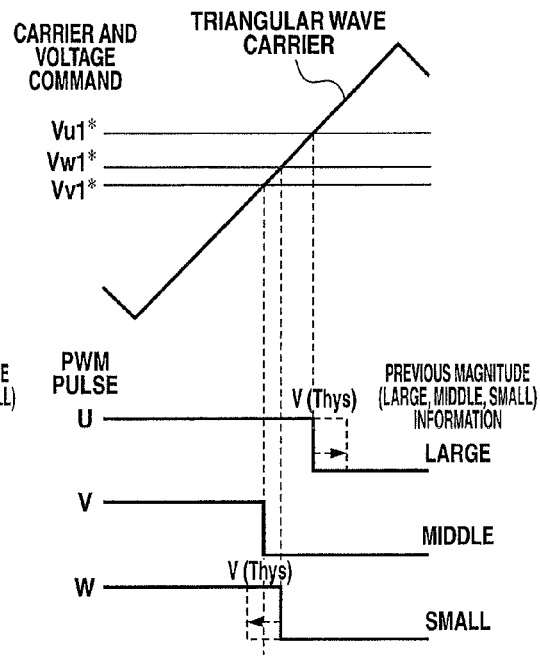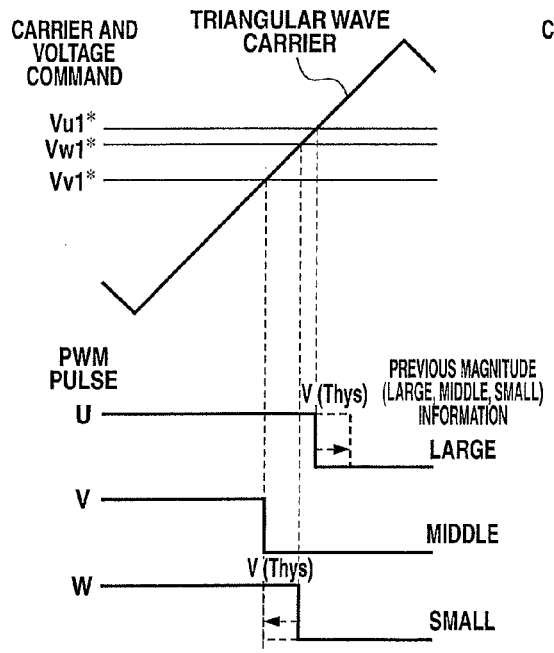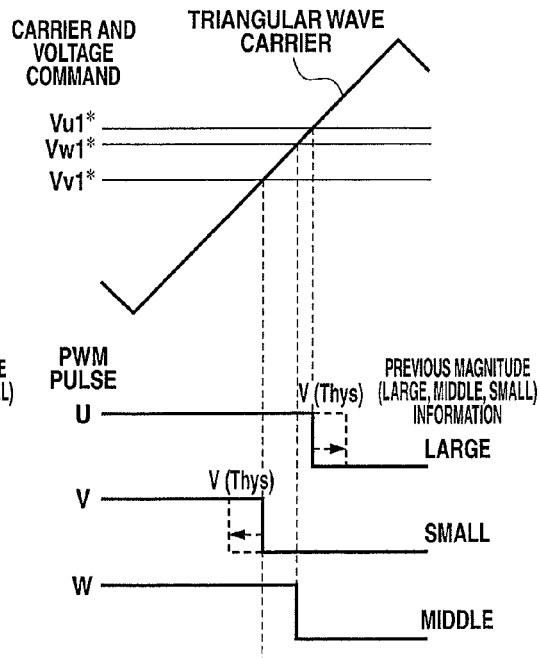

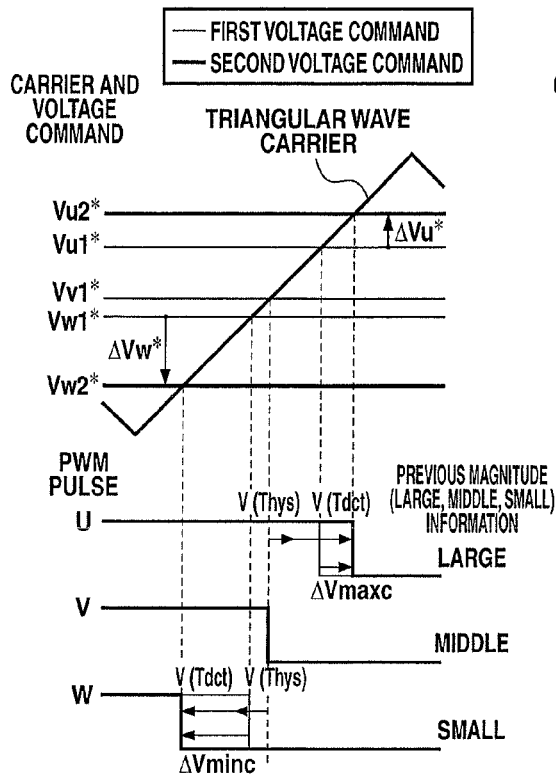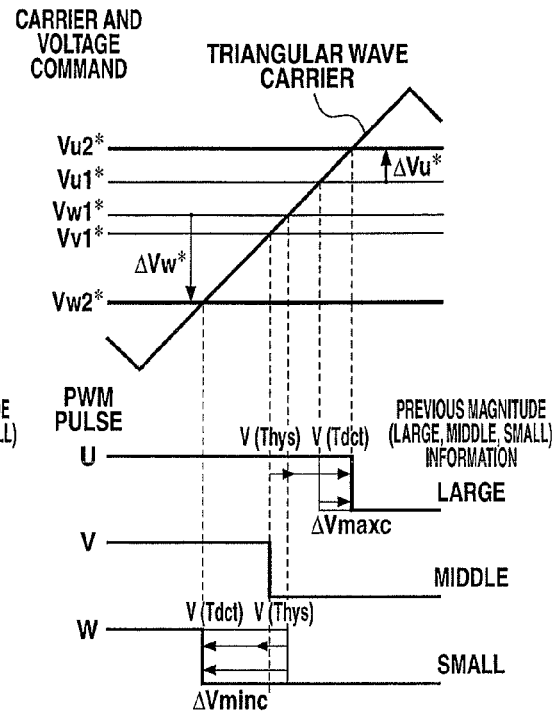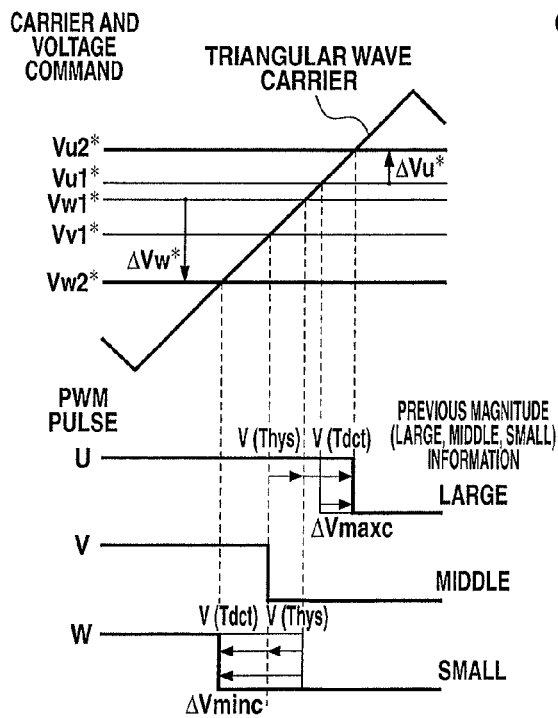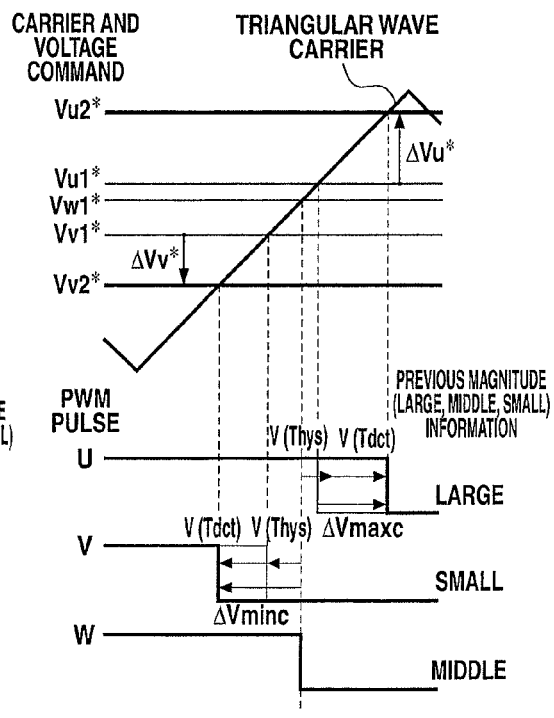

ELECTRICALLY DRIVEN POWER STEERING SYSTEM AND CONTROL APPARATUS FOR THE SAME

BACKGROUND OF THE INVENTION (1) Field of the Invention

The present invention relates to an electrically driven power steering system and a control apparatus for the electrically driven power steering system.

(2) Description of Related Art

In general, in an electrically driven power steering system, a motor current is feedback controlled using motor phase currents. Previously proposed methods of detecting the three phase currents for respective phases using a single current sensor are exemplified in two Japanese Patent Application First Publications No. 2001-327173 published on Nov. 22, 2001 and No. 2008-131770 published on Jun. 5, 2008. In the above-described two Japanese Patent Application First Publications, when voltage command values of three phases are assumed to be a maximum phase, a middle phase, and a minimum phase in a magnitude (decreasing) order, such a phase correction that phases of PWM pulses of the maximum phase and the minimum phase with respect to a PWM switching timing of the middle phase are shifted secures a time duration required to detect the phase currents of the respective three phases.

SUMMARY OF THE INVENTION

However, under such a situation that the voltage command values comes near to one another between the respective phases, the voltage command values are fluctuated (vibrated) due to a current ripple developed due to a detection error, a PWM pulse phase correction, and so forth and one of the three phases for which the PWM pulse phase correction is carried out is complicatedly switched to the other one, among the phases in which the voltage command values come close to one another, so that a noisy sound caused by a magneto-strictive sound is developed.

It is, therefore, an object of the present invention to provide an electrically driven power steering system and a control apparatus for the electrically driven power steering apparatus which are capable of reducing the development of the noisy sound due to the magneto-strictive noise.

According to the present invention, when a pre-correction on interval which is a power supply turning on interval of a PWM (Pulse Width Modulation) duty signal of a maximum phase before a correction by means of a pulse shift control is shorter than the pre-correction on interval of a middle phase and a difference between the pre-correction on intervals of a minimum phase and the middle phase becomes equal to or larger than a third predetermined value, one of three phases that has been the maximum phase is switched to a middle phase and one of the remaining two phases that has been the middle phase is switched to the maximum phase and, when the pre-correction on interval of the middle phase is shorter than the pre-correction on interval of the middle phase and its difference between the pre-correction on intervals of the middle phase and of the minimum phase is equal to or larger than the third predetermined value, one of the three phases that has been the middle phase is switched to the minimum phase and one of the remaining two phases that has been the minimum phase is switched to the middle phase.

That is to say, according to one aspect of the present invention, there is provided an electrically driven power steering system comprising: a steering mechanism that steers steerable wheels of a vehicle along with a steering operation of a steering wheel; a three-phase brushless motor that provides a steering assistance force for the steering mechanism; a control apparatus that drivingly controls the three-phase brushless motor on a basis of a driving situation of the vehicle; a current control section disposed in the control apparatus to calculate control command values for the three-phase brushless motor in accordance with the driving situation of the vehicle; a PWM control section disposed in the control apparatus to output a PWM duty signal for each phase of u, v, and w of the three-phase brushless motor in accordance with the control command values; a bridge circuit disposed in the control apparatus to drivingly control the three phase brushless motor and constituted by a switching circuit drivingly controlled by the PWM duty signal; a current sensor disposed in a direct current bus bar connected to the bridge circuit and that detects a direct current bus bar current flowing through the direct current bus bar; a phase current calculation section disposed in the control apparatus to estimate a current value of each phase of u, v, and w of the three phase brushless motor on a basis of the direct current bus bar current when one of the PWM duty signals of a maximum phase whose power supply turning-on time duration is longest is on and the remaining two PWM duty signals of a minimum phase whose power supply turning-on time duration is shortest and of a middle phase whose power supply turning-on time duration is intermediate between the maximum phase and the minimum phase are off and on a basis of the direct current bus bar current when the PWM duty signal of the maximum phase is on and the PWM duty signal of the middle phase is on, from among the PWM duty signals to respective phases u, v, and w of the three-phase brushless motor; a pulse shift control circuit disposed in the control apparatus to perform a pulse shift control such that a phase of an on timing of the PWM duty signal of the maximum phase or the middle phase is corrected such that a difference in the on timings between the PWM duty signals of the maximum phase and of the middle phase becomes equal to or larger than a second predetermined value which is larger than a first predetermined value, when the difference in the on timing of the PWM duty signal of the maximum phase and the on timing of the PWM duty signal of the middle phase is smaller than the first predetermined value, and the phase of the on timing of the PWM duty signal of the middle phase or the minimum phase is corrected such that the difference in the on timings of the PWM duty signals of the middle phase and of the minimum phase becomes equal to or larger than the second predetermined value, when the difference in the on timings of the PWM duty signals of the middle phase and of the minimum phase is smaller than the first predetermined value; and a phase switching control circuit disposed in the pulse shift control circuit to stop a phase correction by means of the pulse shift control circuit, when a pre-correction on interval which is a power supply turning-on duration time of the PWM duty signal of the maximum phase before the correction by means of the pulse shift control is shorter than the pre-correction on interval of the middle phase and a difference between the pre-correction on intervals of the maximum phase and of the middle phase becomes equal to or larger than a third predetermined value, to switch one of the u, v, w phases that has been the maximum phase to the middle phase and to switch one of the remaining two phases that has been the middle phase to the maximum phase and to stop the phase correction by means of the pulse shift control when the pre-correction on interval of the middle phase is shorter than the pre-correction on interval of the minimum phase and the difference between the pre-correction on intervals of the middle phase and of the minimum phase is equal to or larger than the third predetermined value, to switch one of the u, v, w phases that has been the middle phase to the minimum phase and to switch one of the remaining two phases that has been the minimum phase to the middle phase.

According to another aspect of the present invention, there is provided a control apparatus for an electrically driven power steering system, the electrically driven power steering system providing a steering force for steerable wheels through a three phase brushless motor along with the steering operation of the steering wheel, the control apparatus comprising: a current control section configured to calculate a control command value to the three phase brushless motor in accordance with a driving situation of the vehicle; a PWM control section configured to output a PWM duty signal for each phase of the three phase brushless motor in accordance with the control command value; a bridge circuit constituted by a switching circuit drivingly controlled by the PWM duty signals and that drivingly controls the three phase brushless motor; a current sensor disposed in the direct current bus bar connected to the bridge circuit to detect a direct current bus bar current flowing through a direct current bus bar; a phase current calculation section configured to estimate a current value of each phase of u, v, and w of the three phase brushless motor on a basis of the direct current bus bar current when one of the PWM duty signals of a maximum phase whose power supply turning-on time duration is longest is on and the remaining two PWM duty signals of a minimum phase whose power supply turning-on time duration is shortest and of a middle phase whose power supply turning-on time duration is intermediate between the maximum phase and the minimum phase are off and on a basis of the direct current bus bar current when the PWM duty signal of the maximum phase is on and the PWM duty signal of the middle phase is on, from among the PWM duty signals to respective phases u, v, and w of the three-phase blushless motor; a pulse shift control circuit configured to perform a pulse shift control such that a phase of an on timing of the PWM duty signal of the maximum phase or the middle phase is corrected such that a difference in the on timings between the PWM duty signals of the maximum phase and of the middle phase becomes equal to or larger than a second predetermined value which is larger than a first predetermined value, when the difference in the on timing of the PWM duty signal of the maximum phase and the on timing of the PWM duty signal of the middle phase is smaller than the first predetermined value, and the phase of the on timing of the PWM duty signal of the middle phase or the minimum phase is corrected such that the difference in the on timings of the PWM duty signals of the middle phase and of the minimum phase becomes equal to or larger than the second predetermined value, when the difference in the on timing of the PWM duty signals of the middle phase and of the minimum phase is smaller than the first predetermined value; and a phase switching control circuit disposed in the pulse shift control circuit to stop a phase correction by means of the pulse shift control circuit, when a pre-correction on interval which is a power supply turning-on duration time of the PWM duty signal of the maximum phase before the correction by means of the pulse shift control is shorter than the pre-correction on interval of the middle phase and a difference between the pre-correction on intervals of the maximum phase and of the middle phase becomes equal to or larger than a third predetermined value, to switch one of the u, v, w phases that has been the maximum phase to the middle phase and to switch one of the remaining two phase that has been the middle phase to the maximum phase and to stop the phase correction by means of the pulse shift control when the pre-correction on interval of the middle phase is shorter than the pre-correction on interval of the minimum phase and the difference between the pre-correction on intervals of the middle phase and of the minimum phase is equal to or larger than the third predetermined value, to switch one of the u, v, w phases that has been the middle phase to the minimum phase and to switch one of the remaining two phases that has been the minimum phase to the middle phase.

BRIEF DESCRIPTION OF THE DRAWINGS

FIGS. 4(A), 4(B), 4(C), and 4(D) are waveform charts of a triangular wave carrier, three phase voltage commands, and PWM (Pulse Width Modulation) pulses representing operations of a hysteresis correction section 13 and a voltage magnitude (large, middle, small) phase determination section 14 shown in FIG. 3.

FIGS. 5(A), 5(B), 5(C), and 5(D) are waveforms charts of the triangular wave carrier, the voltage commands, and the PWM pulses representing the operation of a PWM pulse manipulated variable calculation section 15 shown in FIG. 3.

DETAILED DESCRIPTION OF THE INVENTION

Hereinafter, an electrically driven power steering system and a control apparatus for the electrically driven power steering system according to the present invention will be described on a basis of the attached drawings.

[First Embodiment]

Figure 1:
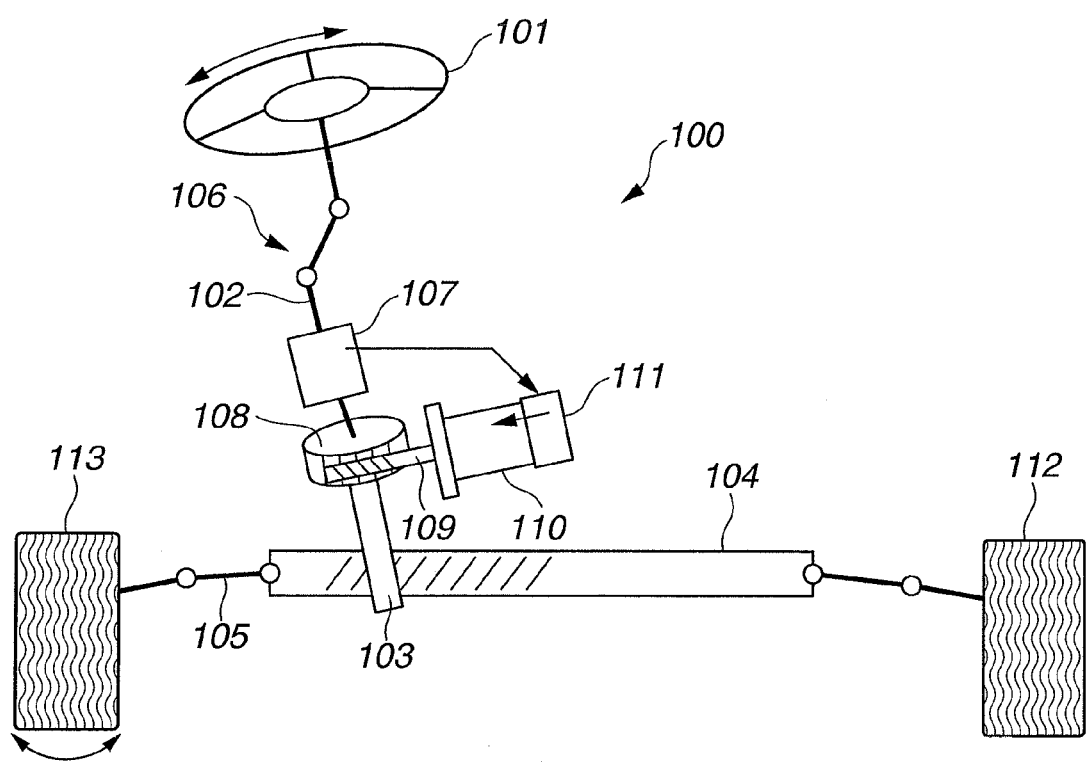
FIG. 1 is a rough configuration view of an electrically driven power steering system to which the present invention is applicable.

FIG. 1 shows a whole configuration view of an electrically driven power steering system 100.

Figure 2:
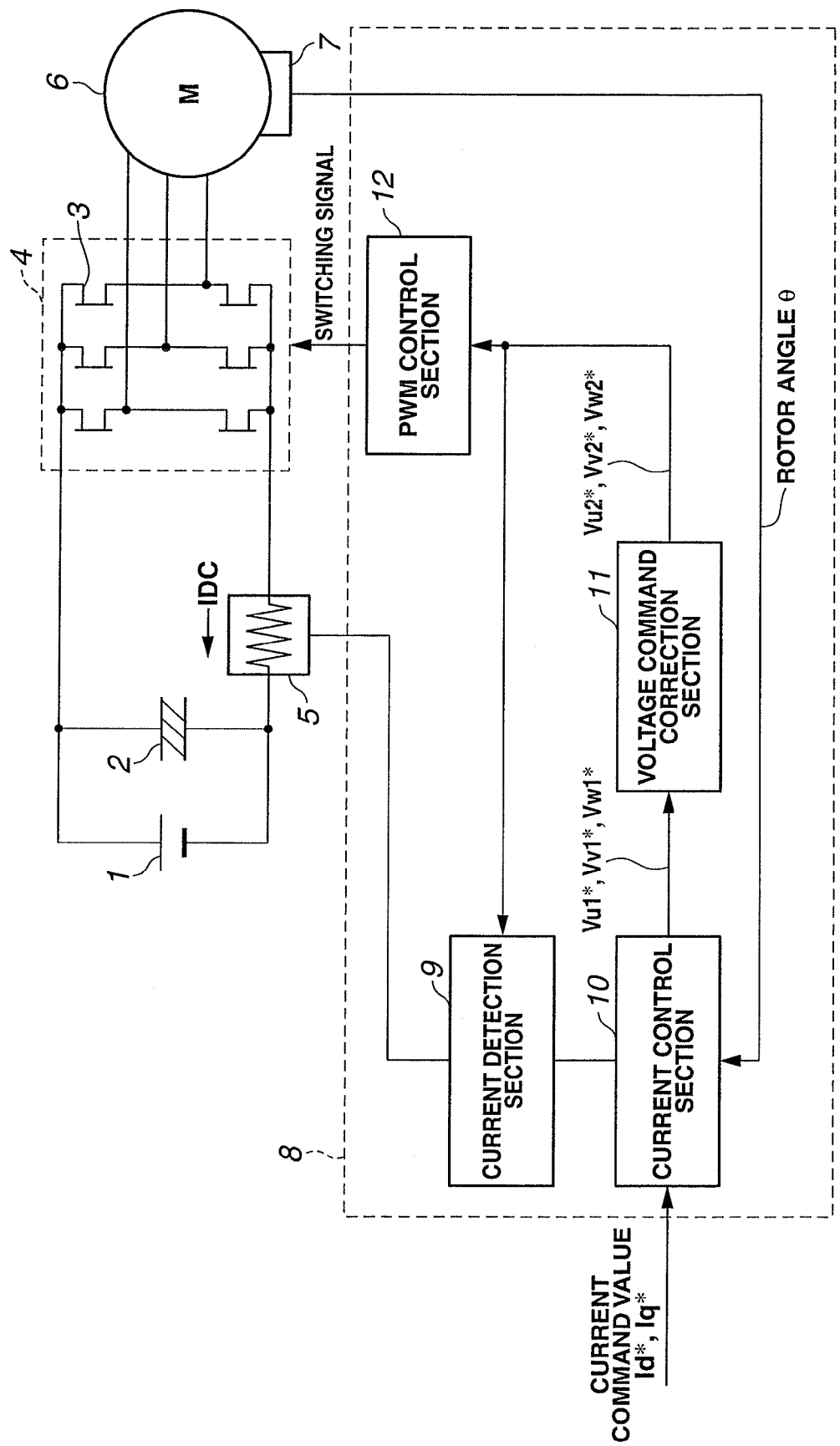
FIG. 2 is a control configuration view of a power steering motor and its peripheral circuit in a first preferred embodiment.

Electrically driven power steering system 100 includes: a steering wheel 101 to which a steering operation by a vehicle driver is inputted; a steering shaft 102 connected to steering wheel 101; a pinion 103 integrally rotated with steering shaft 102; a rack 104 meshed with pinion 103 and which converts a rotation motion of pinion 103 into a linear motion; and a tie rod 105 which transmits the linear motion of rack 104 to a corresponding one of steerable wheels 112, 113. These elements (components) constitute a steering mechanism 106 which transmits the steering operation of steering wheel 101 to steerable wheels 112, 113. In addition, a torque sensor 107 which detects a steering torque inputted to steering wheel 101 and a worm wheel 108 integrally rotated with steering wheel 102 are disposed on steering shaft 102. Worm wheel 108 is meshed with worm shaft 109. A power steering motor 110 disposed on one end side of worm shaft 109 to provide a steering assistance force for steering mechanism 106. Power steering motor 110 is a three-phase brushless motor and is controlled by means of an electronic control unit (ECU) 111. Electronic control unit (control unit) 111 controls the steering assistance force provided by power steering motor 110 in accordance with a driving state of the vehicle such as the steering torque detected by torque sensor 107, a vehicle speed, and so forth FIG. 2 shows a control configuration view of power steering motor 6. Electrically driven motor 6 (power steering motor 110) is connected to a direct current (DC) power supply 1 via a three-phase bridge circuit 4 constituted by six switching elements (a switching circuit) 3. Direct current power supply 1 is, for example, a battery mounted in the vehicle. A smoothing capacitor 2 is connected in parallel to direct current power supply 1. At a downstream side between smoothing capacitor 2 and three-phase bridge circuit 4, namely, at a downstream side of a direct current bus bar, a shunt resistor (current sensor) 5 is disposed. Motor 6 is equipped with a rotor angle sensor 7.

A controller 8 includes: a current detection section (phase current calculation section) 9; a current control section 10; a voltage command correction section (a pulse shift control circuit) 11; and a PWM control circuit 12.

Current detection section 9 inputs a downstream side direct current bus bar current IDC flowing through shunt resistor 5 to detect currents iu, iv, iw flowing through the three phases of motor 6 on a basis of direct current bus bar current IDC.

Current control section 10 inputs externally provided command current values Id*, Iq* and a motor rotor angle θ detected by rotor angle sensor 7 and outputs first three phase voltage command values Vu1*, Vv1*, Vw1* so as to cause command current values Id*, Iq* to flow in motor 6 through a vector control to control three phase currents iu, iv, iw.

Voltage command correction section 11 inputs first voltage command values Vu1*, Vv1*, Vw1*, corrects the first three phase voltage command values for the current detection purpose, and outputs second voltage command values Vu2*, Vv2*, Vw2*(a pulse shift control).

PWM control section 12 compares second voltage command values Vu2*, Vv2*, Vw2* with a triangular wave carrier signal to generate switching signals for three phase bridge circuit 4.

A current IDC flowing through shunt resistor 5 is as follows:

An alternating current (AC) voltage is generated from direct current power supply 1 according to a switching action by three phase bridge circuit 4 so that three phase currents iu, iv, iw are caused to flow in motor 6. An instantaneous voltage generated according to a difference in the switching timing of three bridge circuit 4 causes an instantaneous current IDC to flow through shunt resistor 5. Thus, on a basis of signals of second voltage command values Vu2*, Vv2*, Vw2*, current IDC derives an A-D (Analog-to-digital) timing conversion timing and indicates which phase current of the three phase currents appears in current IDC as instantaneous current IDC.

It should be noted that, in FIG. 2, the structure except motor 6 and direct current power supply 1 is installed in electronic control unit 111 shown in FIG. 1.

Figure 3:
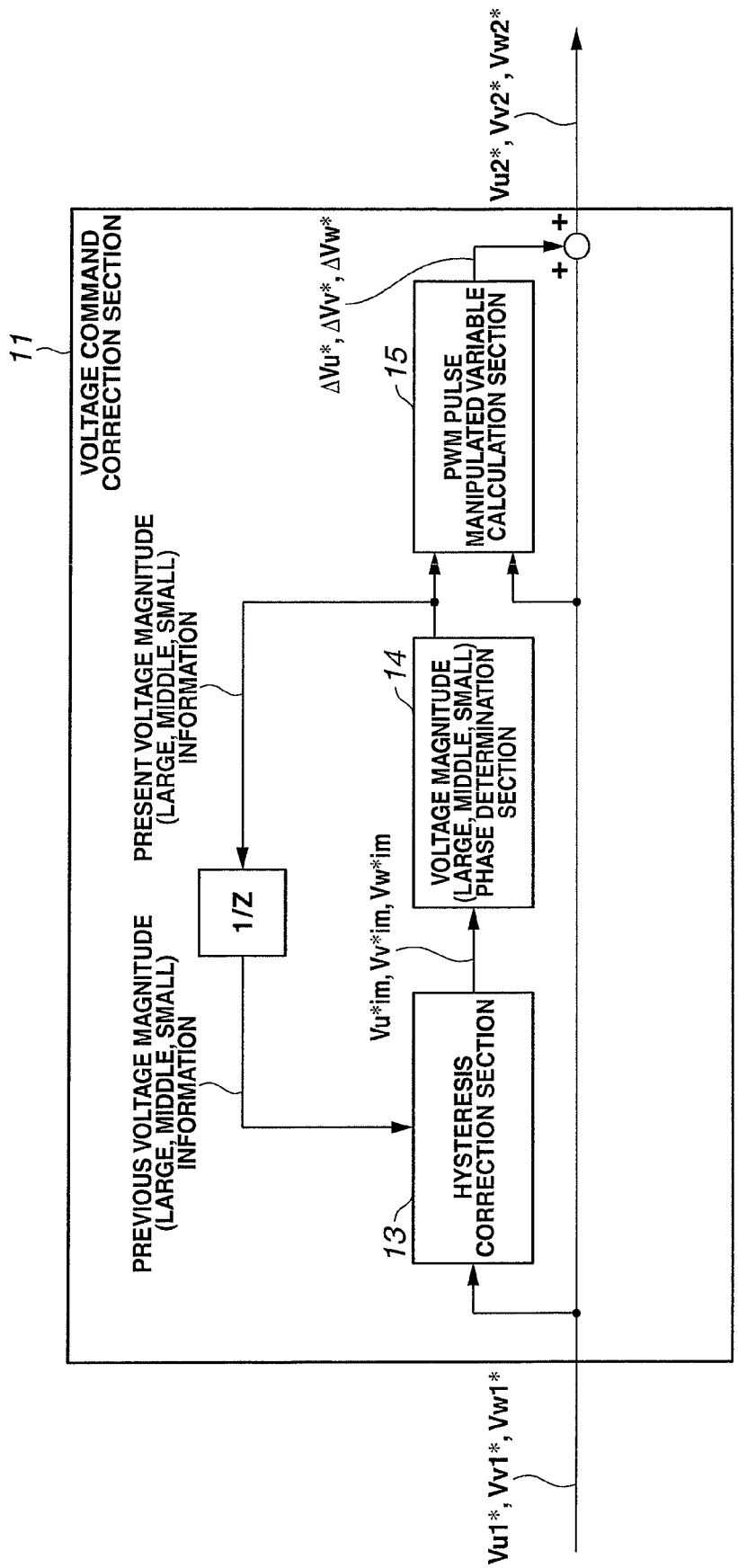
FIG. 3 is a control block diagram of a voltage command correction section 11 shown in FIG. 2.

FIG. 3 shows a control block diagram of a voltage command correction section 11.

Voltage command correction section 11 includes: a hysteresis correction section 13; a voltage magnitude (large, middle, small) determination section 14; and a PWM pulse manipulated variable calculation section (a phase switching control circuit) 15.

Hysteresis correction section 13 outputs virtual voltage command values Vu*im, Vv*im, Vw*im which are corrections of first voltage command values Vu1*, Vv1*, Vw1*, each first voltage command value by a voltage V(Thys) corresponding to a hysteresis Thys (a third predetermined value). Voltage magnitude (large, middle, small) phase determination section 14 inputs virtual voltage command values Vu*im, Vvim*, Vwim* and outputs a result of the magnitude (large, middle, small) determination of the present virtual voltage command values.

PWM pulse manipulated variable calculation section 15 inputs the present magnitude (large, middle, small) phase information and first voltage command values Vu1*, Vv1*, Vw1*, calculates a PWM pulse manipulated variable ΔVmaxc of a voltage large phase (maximum phase) with a voltage middle phase as a criterion (reference) from an interphase voltage difference of a voltage middle phase—voltage small phase, distributes this PWM pulse manipulated variable ΔVmaxc to U-phase, V-phase, W-phase PWM pulse manipulated variables ΔVu*, ΔVv*, ΔVw* according to the present magnitude (large, middle, small) information, and outputs the distributed U-phase, V-phase, W-phase PWM pulse manipulated variables ΔVu*, ΔVv*, ΔVw*.

In addition, PWM pulse manipulated variable calculation section 15 adds first voltage command values Vu1*, Vv1*, Vw1* to PWM pulse manipulated variables ΔVu*, ΔVv*, ΔVw* to output second voltage command values Vu2*, Vv2*, Vw2*.

It should be noted that hysteresis correction section 13 buffers the present magnitude (large, middle, small) phase information and determines one of the phases correcting the voltage corresponding to the hysteresis and a direction of the correction on a basis of the signal outputted as the previous magnitude (large, middle, small) phase information. It should be noted that 1/Z (Z transform) shown in FIG. 3 denotes a time shift corresponding one sampling period.

FIGS. 4(A) through 4(D) show waveform charts of a triangular wave carrier, voltage commands, and PWM pulses for explaining operations of voltage magnitude (large, middle, small) determination section 14. FIGS. 4(A) through 4(D) show a situation in which the voltage command values are transited, namely, such that first voltage command values Vu1*, Vv1*, Vw1* are transited from a state in which Vu1*>Vv1*>Vw1*(refer to FIG. 4(A)), only a voltage small phase (minimum phase) comes near to a voltage middle phase (middle phase), and to a state in which Vu1*>Vw1*>Vv1* (refer to FIG. 4(D)). In FIG. 4(A), the voltage large phase is Vu1*, the voltage middle phase is Vv1*, and the voltage small phase is Vw1*. Hysteresis correction section 13 adds a voltage V(Thys) corresponding to the PWM pulse achieving a time Thys corresponding to the hysteresis to the voltage large phase, subtracts voltage V(Thys) from the voltage small phase, and outputs virtual voltage command values Vu*im, Vv*im, Vw*im.

That is to say, $$Vu^*im = Vu1^* + V(Thys)$$

$$Vv^*im = Vv1^* + 0$$

$$Vw^*im = Vw1^* - V(Thys)$$

Voltage magnitude (large, middle, small) determination section 14 carries out the voltage (large, middle, small) phase determination on a basis of these virtual voltage command values. Hence, although, in FIG. 4(B), a state of the voltage command values indicates Vu1*>Vw1*>Vv1*, the magnitude (large, middle, small) phase information is fixed such that the voltage large phase is U phase, the voltage middle phase is V phase, and the voltage small phase is W phase. Voltage magnitude (large, middle, small) phase determination section 14 updates the voltage magnitude (large, middle, small) phase information when the virtual command values are transited from Vu*im>Vv*im>Vw*im to Vu*im>Vw*im>Vv*im, as shown in FIG. 4(C) and FIG. 4(D) which shows the situation instantaneously after FIG. 4(C).

Therefore, even if, in a situation under which the voltage command values outputted through the current control (section 10) come close between the respective phases, the current ripple generated due to the detection error and the PWM pulse manipulation cause first voltage command values Vu1*, Vv1*, Vw1* outputted by current control section 10 to be swung (fluctuated or vibrated), one of the phases for which the PWM pulse manipulation is carried out is not complicatedly switched.

FIGS. 5(A) through 5(D) show the triangular wave carrier, the voltage commands, and the PWM pulses for explaining the operations of PWM pulse manipulated variable calculation section 15.

The PWM pulse manipulated variables are so designed that a time required to detect minimally IDC instantaneous current can be secured. That is to say, suppose that the time (a detection shortest time) required minimally to detect the instantaneous current of IDC is Tdct, the voltage corresponding to the PWM pulse achieving this Tdct is V(Tdct), the time corresponding to the hysteresis is Thys, and the voltage corresponding to the PWM pulse achieving this Thys is V(Thys). At this time, a maximum value Vpmax of the PWM pulse manipulated variables is as follows:

$$Vp\max=V(Tdct)+V(Thys),$$

wherein $V(Tdct)>0$, $V(Thys)>0$

In addition, the PWM pulse manipulated variables $\Delta Vu^*$, $\Delta Vv^*$, $\Delta Vw^*$ for the respective phases are given as follows, when virtual voltage command values $Vu^*im$, $Vv^*im$, $Vw^*im$ are $Vu^*im>Vv^*im>Vw^*im$.

$$\Delta Vu^*=\Delta\Delta V\max c=Vp\max-(Vu1^*-Vv1^*)$$

$$Vv^*=0$$

$$Vw^*=\Delta V\min c=-(Vp\max-(Vv1^*-Vw1^*)),$$

wherein $0<\Delta V\max c<Vp\max$ and $-Vp\max<\Delta V\min c<0$.

This state is shown in FIGS. 5(A) through 5(D).

FIGS. 5(A) through 5(D) show the PWM pulse manipulated variables in the same situation as shown in FIGS. 4(A) through 4(D) in which the (first) voltage command values are transited, namely, such that first voltage command values Vu1*, Vv1*, Vw1* are transited from the state in which Vu1*>Vv1*>Vw1*(refer to FIG. 5(A)), only a voltage small phase comes near to a voltage middle phase, and to a state in which Vu1*>Vw1*>Vv1*(refer to FIG. 5(D)).

As shown in FIGS. 5(A) through 5(D), since the PWM pulse manipulated variables are V(Tdct)+V(Thys), time Tdct minimally required for the detection of the instantaneous current of IDC can be secured even in a case where the hysteresis is provided.

Suppose that the above-described pulse shift control is started when a difference of on timings of the PWM duty signals between the maximum phase and the middle phase or between the middle phase and the minimum phase is shorter than Tdct+Thys and is ended when the difference of the on timings of the PWM duty signals between the maximum phase and the middle phase or between the middle phase and the minimum phase is longer than Tdct.

In addition, suppose that the PWM pulse manipulated variable is Tdct before the phase switching by means of PWM pulse manipulated variable calculation section 15 and is Tdct+Thys after the phase switching.

Furthermore, suppose that, when a number of rotations per time (a speed) of motor 6 is equal to or higher than a predetermined (speed) value, PWM pulse manipulated variables are Tdct and, when the number of rotations per time of motor 6 is lower than the predetermined (speed) value, the PWM pulse manipulated variables are Tdct+Thys. In addition, suppose that, in a case where an effective value of the three phase alternating voltage generated in PWM control section 12 is equal to or larger than another predetermined (voltage) value, the PWM pulse manipulated variables are Tdct and, when the effective value is smaller than the other predetermined (voltage) value, the PWM pulse manipulated variables are Tdct+Thys.

It should be noted that bold solid lines in an upper part of each of FIGS. 5(A) through 5(D) denotes the second voltage command values and fine solid lines in the upper part of each of FIGS. 5(A) through 5(D) denotes the first voltage command values.

Next, an action of the first embodiment will be explained.
(Problem Points in a Previously Proposed Pulse Shift Control)

In recent years, with the three phase voltage command values outputted through the current control, the PWM pulse are generated on a basis of the three phase command values to drive the inverter to control the motor. In this apparatus described above, such a technique that the phase currents used for the current control are detected from the direct current bus bar current has been used (1 shunt current control). In this technique, the currents of the respective phases are realized by detecting the instantaneous current flowing through the direct current bus bar when a voltage difference (a time difference between the PWM pulses) between each of the phases during a half period of a PWM period is generated. However, in a case where the voltage command values outputted through the current control come close to those of adjacent phases, there is no sufficient PWM pulse time difference to detect the phase currents. Hence, the currents cannot accurately be detected.

Japanese Patent Application First Publication (tokkai) 2001-327173 described above discloses a technique such that the voltage differences between the respective phases (the time differences of the PWM pulses) are monitored for the PWM pulses generated on a basis of the voltage command values outputted through the current control so as to enable an accurate detection of the phase currents even in a case where the voltage command values outputted through the current control come close to the respective phases, the PWM pulses are manipulated (or operated) to expand the voltage differences within the half period of the PWM carrier period so as to enable a minimum securing of the time required to detect, and the PWM pulses are manipulated in a direction to offset the expanded voltage difference at the subsequent period. This technique is called a pulse shift control.

That is to say, when the three phase voltage command values are assumed as the maximum phase, the middle phase, and the minimum phase in the magnitude (decreasing) order, the manipulation of the PWM pulses required for the detection is a manipulation such that the phases of the PMW pulses of the maximum phase and the minimum phase are shifted toward a direction at which the detection time is minimally secured from the PWM timing of the middle phase. This pulse shift control permits the direct current bus bar current to be accurately detected according to the voltage difference expanded at the time of the detection and the motor can accurately be controlled by manipulating the PWM pulses so as to cancel the expanded voltage to make an average command voltage equal to the voltage commands outputted through the current control.

On the other hand, in the previously proposed technique disclosed in the above-identified Japanese Patent Application First Publication No. 2001-327173, a task to be solved is left.

That is to say, the PWM carrier period is divided into a first half (an up of a PWM timer) and a second half (a down of the PWM timer) and the current detection cannot, at all times, be carried out at either one of the first half and the second half. Actually, an FET (Field Effect Transistor) switch to drive the inverter has different operational speeds of ON and OFF and the value of the current ripple is different between that at the first half of the PWM period and that at the second half of the PWM period due to these factors. Hence, a deviation occurs if, during only one half period of the PWM period, the current is detected.

To solve the above-described task, Japanese Patent Application First Publication (tokkai) No. 2008-131770 described above discloses another technique such that the current detection with a high accuracy is carried out without deviation by assuming the manipulation of the PWM pulse per one cycle, one cycle being $(2n+1)/2$ period (n denotes natural number) of the PWM period, and taking the detection interval alternately between the up and down of the PWM timer.

In the above-described previously proposed techniques disclosed in the above-described two Japanese Patent Application First Publications, an operation (manipulation) cycle or an operation (manipulation) pattern are different and the voltage differences between the respective phases are monitored on a basis of the voltage command values outputted through the current control and one of the phases to be pulse manipulated and the pulse manipulated variables are calculated. If, at the present time, the pulse shift control is carried out, the current is instantaneously increased by a value corresponding to the expansion of the voltage difference and the current is instantaneously decreased by the value offset by the expanded voltage difference. That is to say, the current ripple with one cycle of the PWM pulse manipulations as one period is developed and a magnitude of the current ripple is dependent upon the PWM pulse manipulated variable and an electric characteristic of the motor. Furthermore, the current ripple causes a frequency sound (magneto-strictive sound) of PWM pulse manipulation one cycle in a case where one of the phases to be PWM pulse manipulation is carried out is constant (fixed) and a level of the frequency sound is dependent upon the current ripple.

Under such a situation in which the current command values outputted through the current control come close between the respective phases (for example, at a time of a motor approximately non-rotation (the motor approximately stops rotation) and at the time of zero current command 0[A] or a cross point of the three phase alternating voltage), the voltage command values outputted through the current control are swung (fluctuated or vibrated) due to the detection error and the current ripple developed in the PWM pulse manipulations and one of the phases for which the PWM pulse manipulation is carried out is complicatedly switched. Therefore, as is different from a case where one of the phases for which the PWM pulse manipulation is carried out is constant, the magneto-strictive sound has no constant frequency but a variety of frequency sounds (noises) due to the complicated switching of the phase for which the PWM manipulation is carried out. Especially, since the motor control apparatus used for the electrically driven power steering system as in the first embodiment sets the PWM frequency to a range between 15 kHz and 20 kHz to make an FET switching sound of the inverter difficult to be heard (audible range of 200 Hz through 20 kHz). In a case where PWM pulse manipulation period is one cycle with m period of the PWM carrier period, the frequency of the magneto-strictive sound if the phase for which the PWM pulse manipulation is carried out is constant is PWM carrier frequency/m. If one of the phases in which the PWM pulse manipulation is carried out is complicatedly switched, the magneto-strictive sound becomes noisy and gives an unpleasant (noisy) sound.

[Noise Reduction Action]

Figure 6:
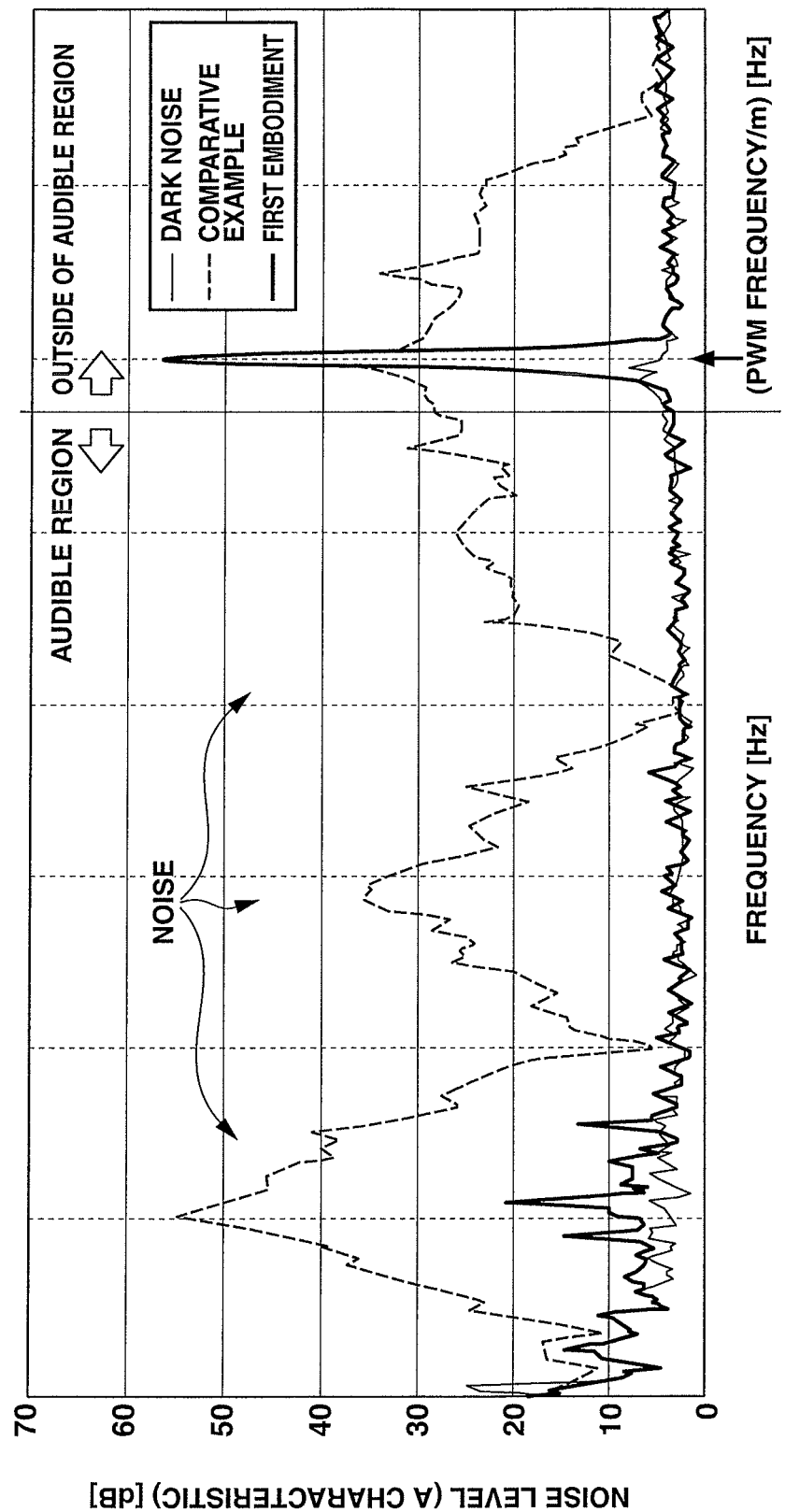
FIG. 6 is a graph representing a noise level reduction action in the first preferred embodiment according to the present invention.

Whereas, in the pulse shift control in the first embodiment, voltage V(Thys) corresponding to the PWM pulses achieving time Thys corresponding to the hysteresis is added to the voltage command value of the voltage large phase from among the three phase first voltage command values and voltage V(Thys) is subtracted from the voltage command value of the voltage small phase to determine the virtual voltage command values and the virtual command values are compared with one another to make the voltage magnitude (large, middle, small) determination. Thus, even if the magnitude of the three phase first voltage command values is complicatedly switched, a function of the hysteresis can suppress the switching of the magnitude (large, middle, small) phase determination result. Hence, the development of the noise due to the noisy magneto-strictive sound can be reduced. FIG. 6 shows a graph representing a noise level reduction action in the first embodiment.

As shown in FIG. 6, the level of the noise in an audible region (range) is remarkably reduced as compared with a comparative example. It should be noted that the comparative example indicates the previously proposed techniques described before.

In addition, the PWM pulse manipulated variables are a voltage (V(Tdct)+V(Thys)) which is an addition of voltage V(Tdct) corresponding to the PWM pulse achieving time Tdct minimally required to detect the instantaneous current of IDC by shunt resistor 5 to voltage V(Thys) to voltage V(Thys) corresponding to the hysteresis.

In the first embodiment, even if actually the magnitude of the phase, namely, the large, middle, and small is switched, the magnitude (large, middle, small) phase determination is carried out by providing the hysteresis for the PWM pulses. Hence, suppose a case where the PWM pulse manipulated variables are V(Tdct) in the same way as the previously proposed techniques described before. In this case, time Tdct required to detect minimally the PWM pulse manipulated variable cannot be secured, the detection accuracy is reduced. Since the PWM pulse manipulated variables are V(Tdct)+V(Thys), time Tdct can be secured even in the case where the hysteresis is provided and the detection accuracy can be increased.

Furthermore, since the pulse manipulated variables are, at all times, constant (V(Tdct)+V(Thys)), the control can be simplified.

In the first embodiment, the pulse shift control is carried out when the difference of the on timings of the PWM duty signals between the maximum phase and the middle phase or between the middle phase and the minimum phase becomes shorter than Tdct+Thys. In other words, in a case where Tdct is secured, the pulse shift control is not started. Thus, a probability of the detection error due to the addition of the hysteresis Thys can be reduced.

In addition, when the difference in the on timings of the PWM duty signals of the middle phase and of the minimum phase or the difference in the on timings of the PWM duty signals of the middle phase and of the minimum phase becomes longer than detection shortest time Tdct, the pulse shift control is ended. In other words, in a case where the pulse shift control is not needed, the pulse shift control is ended and control is returned to PWM control of ordinary timing so that an influence of the pulse shift control can be reduced.

The PWM pulse manipulated variables for the respective phases are Tdct before the phase switching by means of PWM pulse manipulated variable calculation section 15 and Tdct+ Thys after the phase switching. In other words, the reduction of noise by suppressing the pulse shift quantity before the phase switching can be achieved.

In addition, the PWM pulse manipulated variables are Tdct in a case where the number of rotations per time of motor 6 is equal to or higher than the predetermined (speed) value. In a case where the number of rotations of motor 6 per time is lower than the predetermined value, the PWM pulse manipulated variables are Tdct+Thys.

That is to say, when the motor rotation numbers per time (the motor speed) is equal to or higher than the predetermined (speed) value, hysteresis Thys is not added to the correction quantity of the phases since the influence of noise due to the phase switching is minor. Thus, a reduction of a usable range of a duty in a case of the addition of Thys can be suppressed.

Furthermore, in a case where the effective value of the three phase alternating voltage generated by PWM control section 12 is equal to or larger (higher) than the other predetermined (voltage) value, the PWM pulse manipulated variables are Tdct. On the other hand, in a case where the effective value described above is smaller than the other predetermined (voltage) value, the PWM pulse manipulated variables are Tdct+Thys.

That is to say, when the effective value of the three phase alternating voltage is equal to or larger than the other predetermined (voltage) value, a voltage variation quantity to a phase variation quantity is large. Hence, the detection accuracy can be secured even if the PWM pulse manipulated variables are made small. Consequently, the reduction of the usable range of the duty can be suppressed.

In the first embodiment, the following effects can be achieved.

(1) The electrically driven power steering system comprises:

steering mechanism 106 that steers steerable wheels 112, 113 of the vehicle along with the steering operation of steering wheel 101;

power steering brushless motor 110, 6 that provides the steering assistance force for the steering mechanism;

control apparatus 111, 8 that drivingly controls the power steering motor on a basis of the driving situation of the vehicle;

current control section 10 disposed in the electronic control unit 111 to calculate control command values (Vu1*, Vv1*, Vw1*) for the power steering motor 110 in accordance with the driving situation of the vehicle;

PWM control section 12 disposed in the electronic control unit 111 to output the PWM duty signal for each phase of u, v, and w of power steering motor 110 in accordance with the control command values;

bridge circuit 4 disposed in electronic control unit 111 to drivingly control power steering motor 110 and constituted by switching elements 3 drivingly controlled by the PWM duty signals;

shunt resistor 5 disposed in the direct current bus bar connected to the bridge circuit and that detects the direct current bus bar current flowing through the direct current bus bar;

phase current calculation section 9 disposed in electronic control unit 111 to estimate the current value of each phase of u, v, and w of power steering motor 110 on a basis of the direct current bus bar current when one of the PWM duty signals of the maximum phase whose power supply turning-on time duration is longest is on and the remaining two PWM duty signals of the minimum phase whose power supply turning-on time duration is shortest and of the middle phase whose power supply turning-on time duration is intermediate between the maximum phase and the minimum phase are off and on a basis of the direct current bus bar current when the PWM duty signal of the maximum phase is on and the PWM duty signal of the middle phase is on, from among the PWM duty signals to respective phases u, v, and w of power steering motor 110;

voltage command correction section 11 disposed in electronic control unit 111 to perform the pulse shift control such that the phase of the on timing of the PWM duty signal of the maximum phase or the middle phase is corrected such that the difference in the on timings between the PWM duty signals of the maximum phase and of the middle phase becomes equal to or larger than a second predetermined value (Tdct+α) which is larger than a first predetermined value (for example, a time Tdct required minimally for the detection of the instantaneous current of IDC), when the difference in the on timing of the PWM duty signal of the maximum phase and the on timing of the PWM duty signal of the middle phase is smaller than the first predetermined value, and the phase of the on timing of the PWM duty signal of the middle phase or the minimum phase is corrected such that the difference in the on timings of the PWM duty signals of the middle phase and of the minimum phase becomes equal to or larger than the second predetermined value, when the difference in the on timing of the PWM duty signals of the middle phase and of the minimum phase is smaller than the first predetermined value; and PWM pulse manipulated variable calculation section 15 disposed in voltage command correction section 11 of electronic control unit 111 to stop the phase correction by means of the pulse shift control circuit, when a pre-correction on interval which is a power supply turning-on duration time of the PWM duty signal of the maximum phase before the correction by means of the pulse shift control is shorter than the pre-correction on interval of the middle phase and the difference between the pre-correction on intervals of the maximum phase and of the middle phase becomes equal to or larger than a hysteresis Thys to switch one of the u, v, w phases that has been the maximum phase to the middle phase and to switch one of the remaining two phases that has been the middle phase to the maximum phase and to stop the phase correction by means of the pulse shift control, when the pre-correction on interval of the middle phase is shorter than the pre-correction on interval of the minimum phase and the difference between the pre-correction on intervals of the middle phase and of the minimum phase is equal to or larger than hysteresis Thys, to switch one of the u, v, w phases that has been the middle phase to the minimum phase and to switch one of the remaining two phases that has been the minimum phase to the middle phase.

Therefore, the provision of hysteresis Thys for the switching of one of the phases in which the pulse shift control is carried out suppresses the complicated phase switching and can reduce the development of the noisy sound due to the magneto-strictive sound.

(2) The phase correction quantity through the PWM pulse manipulated variable calculation section 15 is a value of an addition of hysteresis Thys to detection shortest time Tdct which is a maximum error quantity of the detection timing at which shunt resistor 5 detects the direct current bus bar current.

Therefore, since the value of the addition of hysteresis Thys to the maximum error quantity of the detection timing minimally required for the detection of the direct current bus bar current is the phase correction quantity, the detection accuracy of the direct current bus bar current can be increased.

(3) When voltage command correction section 11 carries out the pulse shift control when the difference of the on timings of the PWM duty signals of the maximum phase and the middle phase or the difference of the on timings of the PWM duty signals of the middle phase and of the minimum phase becomes shorter than the time of the addition of the detection shortest time Tdct to hysteresis Thys. Hence, the pulse shift start timing is configured as described above so that a probability of the development of the detection error can be reduced.

(4) In the control apparatus for the electrically driven power steering system, the electrically driven power steering system including the steering mechanism 106 that steers steerable wheels 112, 113 of the vehicle along with a steering operation of steering wheel 101 and power steering motor 110, 6 that provides the steering assistance force for the steering mechanism, the control apparatus comprises:

current control section 10 disposed in the electronic control unit 111 to calculate control command values (Vu1*, Vv1*, Vw1*) for the power steering motor 110 in accordance with the driving situation of the vehicle;

PWM control section 12 disposed in the electronic control unit 111 to output the PWM duty signal for each phase of u, v, and w of power steering motor 110 in accordance with the control command values;

bridge circuit 4 disposed in electronic control unit 111 to drivingly control power steering motor 110 and constituted by switching elements 3 drivingly controlled by the PWM duty signals;

shunt resistor 5 disposed in the direct current bus bar connected to the bridge circuit and that detects the direct current bus bar current flowing through the direct current bus bar;

phase current calculation section 9 disposed in electronic control unit 111 to estimate the current value of each phase of u, v, and w of power steering motor 110 on a basis of the direct current bus bar current when one of the PWM duty signals of the maximum phase whose power supply turning-on time duration is longest is on and the remaining two PWM duty signals of the minimum phase whose power supply turning-on time duration is shortest and of the middle phase whose power supply turning-on time duration is intermediate between the maximum phase and the minimum phase are off and on a basis of the direct current bus bar current when the PWM duty signal of the maximum phase is on and the PWM duty signal of the middle phase is on, from among the PWM duty signals to respective phases u, v, and w of power steering motor 110;

voltage command correction section 11 disposed in electronic control unit 111 to perform the pulse shift control such that the phase of the on timing of the PWM duty signal of the maximum phase or the middle phase is corrected such that the difference in the on timings between the PWM duty signals of the maximum phase and of the middle phase becomes equal to or larger than a second predetermined value (Tdct+α) which is larger than a first predetermined value (for example, a time Tdct required minimally for the detection of the instantaneous current of IDC), when the difference in the on timing of the PWM duty signal of the maximum phase and the on timing of the PWM duty signal of the middle phase is smaller than the first predetermined value, and the phase of the on timing of the PWM duty signal of the middle phase or the minimum phase is corrected such that the difference in the on timings of the PWM duty signals of the middle phase and of the minimum phase becomes equal to or larger than the second predetermined value, when the difference in the on timings of the PWM duty signals of the middle phase and the minimum phase is smaller than the first predetermined value; and PWM pulse manipulated variable calculation section 15 disposed in voltage command correction section 11 of electronic control unit 111 to stop the phase correction by means of the pulse shift control circuit, when a pre-correction on interval which is a power supply turning-on duration time of the PWM duty signal of the maximum phase before the correction by means of the pulse shift control is shorter than the pre-correction on interval of the middle phase and the difference between the pre-correction on intervals of the maximum phase and of the middle phase becomes equal to or larger than a hysteresis Thys to switch one of the u, v, w phases that has been the maximum phase to the middle phase and to switch one of the remaining two phases that has been the middle phase to the maximum phase and to stop the phase correction by means of the pulse shift control, when the pre-correction on interval of the middle phase is shorter than the pre-correction on interval of the minimum phase and the difference between the pre-correction on intervals of the middle phase and of the minimum phase is equal to or larger than hysteresis Thys, to switch one of the u, v, w phases that has been the middle phase to the minimum phase and to switch one of the remaining two phases that has been the minimum phase to the middle phase.

Thus, the complicated phase switching is suppressed and the generation of noise due to the magneto-strictive sound is reduced by providing hysteresis Thys for the switching of the phase for which the pulse shift control is carried out

[Other Embodiments]

As described hereinabove, the present invention has been described on a basis of the first preferred embodiment. However, the present invention is not limited to the structure described in the first embodiment.

Various modifications can be made without departing from the scope of the claims.

For example, in the first embodiment, the current sensor (shut resistor 5) is disposed at the downstream side of the direct current bus bar but the current sensor may be disposed at an upstream side of the direct current bus bar.

Technical ideas graspable from the embodiments described above except the claims 1 to 4 will be described below.

(a) The electrically driven power steering system as claimed in claim 2, wherein the pulse shift control circuit ends the pulse shift control when the difference in the on timings of the PWM duty signals of the maximum phase and of the middle phase or the difference in the on timings of the PWM duty signals between the middle phase and the minimum phase is longer than the detection shortest time.

Therefore, when the pulse shift control is not required, the pulse shift control is ended and control is returned to the ordinary PWM control at the ordinary timing so that the influence of the pulse shift control can be reduced.

(b) The electrically driven power steering system as claimed in claim 2, wherein a correction quantity for the phase through the pulse shift control circuit is, at all times, a value of an addition of the detection shortest time to the third predetermined value.

Therefore, since the correction quantity is the constant value, the control can be simplified.

(c) The electrically driven power steering system as claimed in claim 1, wherein the correction quantity of the phase through the pulse shift control circuit is the detection shortest time before the switching by means of the phase switching control circuit and is a value of the detection shortest time to which the third predetermined value after the switching through the phase switching control circuit.

Therefore, since the pulse shift quantity before the phase switching control is suppressed, the reduction of the noise can be achieved.

(d) The electrically driven power steering system as claimed in claim 1, wherein the pulse shift control circuit sets the correction quantity of the phase to the detection shortest time when a revolution speed of the three phase brushless motor is equal to or larger (higher) than a predetermined speed value.

Thus, when the revolution speed of the motor is equal to or higher than the predetermined speed, the influence of noise due to the phase switching is small. Hence, the third predetermined value is not added to the correction quantity of the phase so that a reduction of usable range of the duty in the case where the third predetermined value is added to the correction quantity of the phase can be suppressed.

(e) The electrically driven power steering system as claimed in claim 1, wherein the pulse shift control circuit sets a correction quantity of the phase to a value smaller than a value of the detection shortest time to which the third predetermined value is added, when an effective value of a three phase alternating voltage generated by the PWM control section is equal to or larger than a predetermined voltage value.

Hence, when the effective value of the three phase alternating current (AC) voltage is equal to or larger than the predetermined value, the voltage variation quantity to the phase variation quantity is large. Thus, even if the correction quantity of the phase is made small, the detection accuracy of the phase currents can be secured and, consequently, the reduction of the duty usable range can be suppressed.

(f) The control apparatus for the electrically driven power steering system as claimed in claim 4, wherein the correction quantity of the phase through the pulse shift control circuit is a value of a detection shortest time which is a maximum error quantity of a detection timing at which the current sensor detects a direct current bus bar current to which a third predetermined value is added. Hence, since the value of addition of the third predetermined value to the detection shorted time which is the maximum error quantity of the detection timing at which the current sensor detects the direct current bus bar current is the phase correction quantity, the detection accuracy of the direct current bus bar current can be increased.

(g) The control apparatus for the electrically driven power steering system as set forth in item (f), wherein the pulse shift control carries out the pulse shift control, when the difference in the on timings of the PWM duty signals between the maximum phase and the middle phase or the difference in the on timings of the PWM duty signals between the middle phase and the minimum phase becomes shorter than a time of the detection shortest time to which the third predetermined value is added. Therefore, since the pulse shift control start timing is constructed as described above, a possibility of generation of the detection error can be reduced, as compared with the case where the third predetermined value is not added.

(h) The control apparatus for the electrically driven power steering system as set forth in item (f), wherein the pulse shift control circuit ends the pulse shift control, when the difference in the on timings of the PWM duty signals between the middle phase and the minimum phase or the difference in the on timings of the PWM duty signals between the middle phase and the minimum phase becomes longer than the detection shortest time.

Thus, when the pulse shift control becomes unnecessary, the pulse shift control is ended and control is returned to the PWM control at the ordinary timing so that the influence of the pulse shift control can be reduced.

(j) The control apparatus for the electrically driven power steering system as claimed in claim 4, wherein the correction quantity of the phase through the pulse shift control circuit is the detection shortest time before the switching through the phase switching control circuit and is a value of the detection shortest time to which the third predetermined value is added after the switching through the phase switching control circuit. Hence, the pulse shift quantity before the phase switching control is suppressed so that the reduction of the noise can be achieved.

(k) The control apparatus for the electrically driven power steering system as claimed in claim 4, wherein the pulse shift control circuit sets the correction quantity of the phase to the detection shortest time when a revolution speed of the three phase brushless motor is equal to or larger than a predetermined speed.

Hence, when the number of revolutions of motor per time (revolution speed) of motor is equal to or higher (larger) than the predetermined speed, the influence of noise due to the phase switching is minor. Thus, the third predetermined value is not added to the phase correction quantity. Consequently, the reduction of the usable range of the duty in a case where the third predetermined value is added can be suppressed.

(l) The control apparatus for the electrically driven power steering system as claimed in claim 4, wherein the pulse shift control circuit sets a correction quantity of the phase to a value smaller than a value of the detection shortest time to which the third predetermined value is added, when an effective value of a three phase alternating voltage generated by the PWM control section becomes equal to or larger (higher) than a predetermined voltage value.

Hence, when the effective value of the three phase alternating current (AC) voltage is equal to or larger than the predetermined (voltage) value, the voltage variation quantity to the phase variation quantity is large. Thus, even if the correction quantity of the phase is made small, the detection accuracy of the phase currents can be secured and, consequently, the reduction of the duty usable range can be suppressed.

It should be noted that a bold dot line shown in a lower part of each of FIGS. 4(A) through 4(D) denotes virtual voltage command values described above.

This application is based on a prior Japanese Patent Application No. 2012-203868 filed in Japan on Sep. 18, 2012. The entire contents of this Japanese Patent Application No. 2012-203868 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. An electrically driven power steering system comprising:
   a steering mechanism that steers steerable wheels of a vehicle along with a steering operation of a steering wheel;
   a three-phase brushless motor that provides a steering assistance force for the steering mechanism;
   a control apparatus that drivingly controls the three-phase brushless motor on a basis of a driving situation of the vehicle;
   a current control section disposed in the control apparatus to calculate control command values for the three-phase brushless motor in accordance with the driving situation of the vehicle;
   a PWM control section disposed in the control apparatus to output a PWM duty signal for each phase of u, v, and w of the three-phase brushless motor in accordance with the control command values;
   a bridge circuit disposed in the control apparatus to drivingly control the three phase brushless motor and constituted by a switching circuit drivingly controlled by the PWM duty signal;
   a current sensor disposed in a direct current bus bar connected to the bridge circuit and that detects a direct current bus bar current flowing through the direct current bus bar;
   a phase current calculation section disposed in the control apparatus to estimate a current value of each phase of u, v, and w of the three phase brushless motor on a basis of the direct current bus bar current when one of the PWM duty signals of a maximum phase whose power supply turning-on time duration is longest is on and the remaining two PWM duty signals of a minimum phase whose power supply turning-on time duration is shortest and of a middle phase whose power supply turning-on time duration is intermediate between the maximum phase and the minimum phase are off, and on a basis of the direct current bus bar current when the PWM duty signal of the maximum phase is on and the PWM duty signal of the middle phase is on, from among the PWM duty signals to respective phases u, v, and w of the three-phase brushless motor;
   a pulse shift control circuit disposed in the control apparatus to perform a pulse shift control such that a phase of an on timing of the PWM duty signal of the maximum phase or the middle phase is corrected such that a difference in the on timings between the PWM duty signals of the maximum phase and of the middle phase becomes equal to or larger than a second predetermined value which is larger than a first predetermined value, when the difference in the on timing of the PWM duty signal of the maximum phase and the on timing of the PWM duty signal of the middle phase is smaller than the first predetermined value, and the phase of the on timing of the PWM duty signal of the middle phase or the minimum phase is corrected such that the difference in the on timings of the PWM duty signals of the middle phase and of the minimum phase becomes equal to or larger than the second predetermined value, when the difference in the on timings of the PWM duty signals of the middle phase and of the minimum phase is smaller than the first predetermined value; and
   a phase switching control circuit disposed in the pulse shift control circuit to stop a phase correction by means of the pulse shift control circuit, when a pre-correction on interval which is a power supply turning-on duration time of the PWM duty signal of the maximum phase before the correction by means of the pulse shift control is shorter than the pre-correction on interval of the middle phase and a difference between the pre-correction on intervals of the maximum phase and of the middle phase becomes equal to or larger than a third predetermined value, to switch one of the u, v, w phases that has been the maximum phase to the middle phase and to switch one of the remaining two phases that has been the middle phase to the maximum phase and to stop the phase correction by means of the pulse shift control, when the pre-correction on interval of the middle phase is shorter than the pre-correction on interval of the minimum phase and the difference between the pre-correction on intervals of the middle phase and of the minimum phase is equal to or larger than the third predetermined value, to switch one of the u, v, w phases that has been the middle phase to the minimum phase and to switch one of the remaining two phases that has been the minimum phase to the middle phase.

2. The electrically driven power steering apparatus as claimed in claim 1, wherein a correction quantity of the phase in the pulse shift control circuit is a value of a detection shortest time which is a maximum error quantity of a detection timing at which the current sensor detects the direct current bus bar current to which the third predetermined value is added.

3. The electrically driven power steering apparatus as claimed in claim 2, wherein the pulse shift control circuit performs the pulse shift control, when a difference of the on timings of the PWM duty signals of the maximum phase and of the middle phase or a difference of the on timings of the PWM duty signals of the middle phase and of the minimum phase becomes shorter than a time duration which is an addition value between the detection shortest time and the third predetermined value.

4. The electrically driven power steering system as claimed in claim 2, wherein the pulse shift control circuit ends the pulse shift control when the difference in the on timings of the PWM duty signals of the maximum phase and of the middle phase or the difference in the on timings of the PWM duty signals between the middle phase and the minimum phase becomes longer than the detection shortest time.

5. The electrically driven power steering system as claimed in claim 2, wherein a correction quantity for the phase through the pulse shift control circuit is, at all times, a value of an addition of the third predetermined value to the detection shortest time.

6. The electrically driven power steering system as claimed in claim 1, wherein the correction quantity of the phase by means of the pulse shift control circuit is the detection shortest time before the switching by means of the phase switching control circuit and is a value of the detection shortest time to which the third predetermined value is added after the switching by means of the phase switching control circuit.

7. The electrically driven power steering system as claimed in claim 1, wherein the pulse shift control circuit sets the correction quantity of the phase to the detection shortest time when a revolution speed of the three phase brushless motor becomes equal to or larger than a predetermined speed value.

8. The electrically driven power steering system as claimed in claim 1, wherein the pulse shift control circuit sets a correction quantity of the phase to a value smaller than a value of the detection shortest time to which the third predetermined value is added, when an effective value of a three phase alternating voltage generated by the PWM control section is equal to or larger than a predetermined voltage value.

* * * * *